United States Patent
Becker

(10) Patent No.: US 9,132,701 B2
(45) Date of Patent: *Sep. 15, 2015

(54) PNEUMATIC VEHICLE TIRE

(71) Applicant: Continental Reifen Deutschland GmbH, Hannover (DE)

(72) Inventor: Theresia Becker, Duesseldorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,501

(22) Filed: Sep. 11, 2013

(65) Prior Publication Data
US 2014/0008001 A1  Jan. 9, 2014

Related U.S. Application Data

(63) Continuation of application No. PCT/EP2012/050274, filed on Jan. 10, 2012.

(30) Foreign Application Priority Data

Mar. 11, 2011 (DE) .......................... 10 2011 001 228

(51) Int. Cl.
*B60C 9/22* (2006.01)
*B60C 9/20* (2006.01)
*B60C 9/18* (2006.01)

(52) U.S. Cl.
CPC ... *B60C 9/18* (2013.01); *B60C 9/20* (2013.01); *B60C 9/2006* (2013.04); *B60C 9/22* (2013.01); *B60C 2009/208* (2013.04); *B60C 2009/2012* (2013.04); *B60C 2009/2074* (2013.04); *B60C 2009/2214* (2013.04); *B60C 2200/06* (2013.04)

(58) Field of Classification Search
CPC .......... B60C 9/22; B60C 9/2006; B60C 9/20; B60C 9/18; B60C 2009/2012; B60C 2009/2074; B60C 2009/2214
USPC .................................. 152/531, 533, 527, 526
See application file for complete search history.

(56) References Cited

U.S. PATENT DOCUMENTS 5,772,810 A    6/1998  Cluzel
6,401,778 B1   6/2002  Cluzel
(Continued)

FOREIGN PATENT DOCUMENTS

DE    10 2010 016 569 A1 * 10/2011
WO    WO-2012/055598 A1 *  5/2012
WO    WO-2012/123132 A1 *  9/2012

OTHER PUBLICATIONS

International Search Report dated May 7, 2012 of international application PCT/EP2012/050274 on which this application is based.

*Primary Examiner* — Adrienne C Johnstone
(74) *Attorney, Agent, or Firm* — Walter Ottesen P.A.

(57) ABSTRACT

A vehicle pneumatic tire for utility vehicles includes a carcass (5), a belt (9) and a profiled tread (10), wherein the belt (9) has three belt layers (13, 14, 15). The radial inner (13) and the radial outer (15) belt layers are working layers having reinforcements (23, 25) made of steel. The belt layer (14) is arranged between the two working layers (13, 15) and is a belt layer configured as a zero degree layer. The two working layers (13, 15) are wider than the belt layer (14) and are coupled to each other in the axial direction outside of the belt layer (14) at a length (p) of p>0 mm so that the distance (s) of the reinforcement (23) of the one working layer (13) to the reinforcement (25) of the other working layer (15) is given as s<1.5 mm.

18 Claims, 7 Drawing Sheets

(56) References Cited

U.S. PATENT DOCUMENTS

| | | |
|---|---|---|
| 2002/0033213 A1 | 3/2002 | Cluzel |
| 2006/0169380 A1* | 8/2006 | Radulescu et al. ............ 152/531 |
| 2006/0169381 A1* | 8/2006 | Radulescu et al. ............ 152/531 |
| 2010/0282389 A1* | 11/2010 | Johnson et al. |
| 2010/0294413 A1 | 11/2010 | Johnson et al. |
| 2011/0308686 A1* | 12/2011 | Chaulet et al. |
| 2012/0318426 A1 | 12/2012 | Bederna et al. |
| 2013/0186543 A1* | 7/2013 | Viller |
| 2013/0248073 A1* | 9/2013 | Becker et al. ................. 152/527 |

* cited by examiner

PNEUMATIC VEHICLE TIRE

CROSS REFERENCE TO RELATED APPLICATIONS

This application is a continuation application of international patent application PCT/EP2012/050274, filed Jan. 10, 2012, designating the United States and claiming priority from German application 10 2011 001 228.1, filed Mar. 11, 2011, and the entire content of both applications is incorporated herein by reference.

FIELD OF THE INVENTION

The invention relates to a pneumatic vehicle tire, in particular for utility vehicles, having a carcass, having a belt which is constructed radially outside the carcass and having a profiled tread which is constructed radially outside the belt on the belt. The belt is formed from at least three belt plies arranged lying one on top of the other from the radial inside to the radial outside. The radially inner belt ply and the radially outer belt ply are working plies with parallel reinforcement members made of steel, which are embedded in rubber. The reinforcement members of the radially inner working ply enclose in their orientation an angle $\alpha$ with respect to the circumferential direction U where $10°\leq\alpha\leq45°$, and the reinforcement members of the radially outer working ply enclose an angle $\gamma$ with respect to the circumferential direction U where $10°\leq\gamma\leq45°$. When viewed in the circumferential direction U of the vehicle tire, the reinforcement members of the one working ply have an opposing axial direction of inclination to the reinforcement members of the other working ply. At 10% of the breaking strength, the reinforcement members of the two working plies each have a respective extension D of $0.22\%\leq D\leq0.4\%$. The belt ply, which is arranged between these two working plies, is a belt ply which is embodied as a zero-degree ply with parallel reinforcement or strengthening members which are embedded in rubber and which enclose in their orientation an angle $\beta$ where $0°\leq\beta\leq5°$ with respect to the circumferential direction U.

BACKGROUND OF THE INVENTION

Conventional pneumatic tires for utility vehicles usually have a four-ply belt with what is referred to as a triangular configuration in which two working plies are arranged one on top of the other in the radial direction, the steel cords of which are at an angle of approximately 15° to 30° with respect to the circumferential direction, wherein the steel cords of the one working ply and those of the second working ply are inclined in different axial directions A. As a result, the working plies form a diagonal assembly. In such belts there is usually a belt ply embodied as a barrier ply which is located under the working plies, the steel cords of which are at an angle of 45° to 60° with respect to the circumferential direction, as a result of which the cords of the working plies and of the barrier ply form a triangular assembly. In addition, usually an additional protective ply which forms the fourth belt ply is formed above the two working plies, the steel cords of which protective ply are also at an angle of approximately 45° to 30° with respect to the circumferential direction of the vehicle tire. Such belts have a limited circumferential strength. The possibility of moving the belt edges, which this provides, can have an adverse effect on the durability of the tire. The belt can also be subject to radial expansion during operation. This growth can lead to excessive unequal wear of the tire.

It is also known to form pneumatic tires for utility vehicles with a four-ply arrangement with a radially inner barrier ply with steel cords which enclose an angle of approximately 45° to 65° with respect to the circumferential direction, with two working plies which are formed over the barrier ply and which form in a conventional way a diagonal assembly of their steel cords with an orientation of the steel cords of in each case approximately 15° to 30°, and with a fourth belt ply which is formed radially outside the two working plies on the outer working ply and which is embodied as what is referred to as a zero-degree ply, wherein the reinforcement members thereof composed of steel cords are oriented essentially in the circumferential direction with an angle of 0° to 2.5° with respect to the circumferential direction. In such formations, the circumferential strength of the belt is increased, which has a positive effect on the durability of the belt. However, the influence of the zero-degree ply is limited essentially to the radially outer working ply. However, the inner working ply is formed with residual mobility, still with adverse effects on the durability and wear.

Furthermore, occasionally a formation of a pneumatic tire for a utility vehicle with a belt arrangement in which a zero-degree ply is formed radially between the two working plies has been proposed. The two working plies continue to be formed in the diagonal assembly in these proposed embodiments and their steel cords are oriented with angles of, in each case, approximately 18° with respect to the circumferential direction. In point of fact, this embodiment permits a high level of circumferential strength and improved durability and an improved wear performance compared to a conventional pneumatic tire for a utility vehicle. The steel cords of these known working plies are usually steel cords of the type 3×0.20+6×0.35NT. So that these steel cords, which have a breaking strength F of 1700N and an extension of less than 0.15% at 10% of the breaking strength, maintain a sufficient puncture resistance, a multiplicity of steel cords with relatively thin cross section are formed with a high arrangement density in the working plies. Steel cords with a large cross sectional thickness, which would promote the belt durability, are as a result usable only to a limited degree. Even if they were used, they give rise to the high arrangement density which is necessary to limit the risk of puncturing, large belt ply weight, large quantities of material and a negative influence on the wear.

U.S. Pat. No. 5,772,810 A discloses a pneumatic tire for a utility vehicle, having a belt ply design with a zero degree ply which is embodied between two working plies with such non extendable reinforcement members. In U.S. Pat. No. 5,772,810 A, it is proposed to couple the working plies outside the zero degree ply in order to overcome the problems associated with these belt ply designs with non extendable reinforcement members, these problems involving restricted belt durability due to belt edge movement of the non extendable reinforcement members.

United States patent application publication 2012/0318426 discloses a pneumatic tire for a utility vehicle, having a belt arrangement with another belt design with a zero degree ply which is embodied radially between the two working plies. The two working plies are also embodied in the diagonal assembly. The reinforcement members of the two working plies are extendable with an extension D of $0.22\%\leq D\leq0.4\%$ at 10% of the breaking strength. The pneumatic tire for a utility vehicle, which is known from this publication, enables, through this embodiment with extendable reinforcement members, a significantly improved belt durability by utilizing the advantages of the arrangement of the zero degree ply between the working plies in contrast with the previously known pneumatic tires for a utility vehicle having belts whose reinforcement members of the working plies are embodied with non extendable reinforcement members.

SUMMARY OF THE INVENTION

It is an object of the invention to further reduce the rolling resistance in a pneumatic vehicle tire.

The object is achieved according to the invention by an embodiment of a pneumatic vehicle tire, in particular for utility vehicles, having a carcass, having a belt which is constructed radially outside the carcass and having a profiled tread which is constructed radially outside the belt on the belt, wherein the belt is formed from at least three belt plies arranged lying one on top of the other from the radial inside to the radial outside, wherein the radially inner belt ply and the radially outer belt ply are working plies with parallel reinforcement members made of steel, which are embedded in rubber, wherein the reinforcement members of the radially inner working ply enclose in their orientation an angle $\alpha$ with respect to the circumferential direction U where $10°\leq\alpha\leq45°$, and the reinforcement members of the radially outer working ply enclose an angle $\gamma$ with respect to the circumferential direction U where $10°\leq\gamma\leq45°$, wherein, when viewed in the circumferential direction U of the vehicle tire, the reinforcement members of the one working ply have an opposing axial direction of inclination to the reinforcement members of the other working ply and, at 10% of the breaking strength, the reinforcement members of one, in particular both, of the two working plies respectively have an extension D of $0.22\%\leq D\leq0.4\%$, and wherein the belt ply which is arranged between these two working plies is a belt ply which is embodied as a zero-degree ply with parallel reinforcement members which are embedded in rubber and which enclose in their orientation an angle $\beta$ where $0°\leq\beta\leq5°$ with respect to the circumferential direction U. According to the invention, both working plies are made wider than the belt ply which is embodied as a zero-degree ply and are coupled in contact with one another in the axial direction A of the pneumatic vehicle tire on both sides outside the belt ply embodied as a zero-degree ply, along an extension section with a length p>0 mm, in which extension section the distance (s), measured in the radial direction R, of the reinforcement members of the one working ply with respect to the reinforcement members of the other working ply is embodied with s≤1.5 mm.

Thus, the pneumatic vehicle tire of the invention defines a circumferential direction (U), a radial direction (R) and an axial direction (A). The pneumatic vehicle tire includes: a carcass; at least a first, a second and a third belt ply arranged resting one on top the other radially inward to radially outward and the plurality of belt plies conjointly defining a tire belt configured radially outside the carcass; a profiled tread constructed radially outside the belt and built up on the belt; the first belt ply being configured as a radially inner working ply having a plurality of parallel first reinforcement members made of steel embedded in rubber; the third belt plies being configured as a radially outer working ply having a plurality of parallel third reinforcement members made of steel embedded in rubber; the second belt ply being configured as a zero-degree ply having second reinforcement members embedded in rubber and being arranged between the first and the third belt plies; the first reinforcement members of the inner working ply having an orientation which, with reference to the circumferential direction (U), encloses an angle $\alpha$ lying in a range of $10°\leq\alpha\leq45°$; the third reinforcement members of the outer working ply having an orientation which, with reference to the circumferential direction (U), encloses an angle $\gamma$ lying in a range of $10°\leq\gamma\leq45'$; the first reinforcement members having, in relation to the circumferential direction (U), an axial inclination which is opposite the axial inclination of the third reinforcement members to the circumferential direction (U); the second reinforcement members of the zero degree ply having an orientation which, with reference to the circumferential direction (U), encloses an angle $\beta$ lying in a range of $0°\leq\beta\leq5°$; the first, second and third reinforcement members each having respective breaking strengths; the reinforcement members of at least one of the inner and the outer working plies having an extensibility D lying in a range of $0.22\%\leq D\leq0.4\%$ at 10% of the breaking strength thereof; the zero degree ply having first and second sides in the axial direction (A); the inner working ply and the outer working ply being configured wider than the zero-degree ply such that the inner working ply extends beyond the first side of the zero degree ply in a first axial section and beyond the second side of the zero degree ply in a second axial section and the outer working ply extends beyond the first side of the zero degree ply in a third axial section and beyond the second side of the zero degree ply in a fourth axial section; the first axial section of the inner working ply and the third axial section of the outer working ply being coupled in contact with one another in a first extension region having a width p1>0 mm; the second axial section of the inner working ply and the fourth section of the outer working ply being coupled in contact with one another in a second extension region having a width p2>0 mm; and, the first reinforcement members of the inner working ply and the third reinforcement members of the outer working ply being at a distance s≤1.5 mm from one another in the radial direction in the first and the second extension regions.

According to another feature of the invention, the second reinforcement members recited above are high-elongation cords (HE).

This embodiment ensures tight coupling of the two working plies within the belt in the axial extension region outside the zero-degree ply enclosed between the working plies, over an extension region (p). A high level of belt durability is achieved by the embodiment with belt plies with extendable reinforcement members and the zero-degree ply which is embodied therebetween. The additional coupling of the working plies outside the zero-degree ply reduces the stresses which occur in the region of the cord ends of the belt and their mobility in this belt, as a result of which the rolling resistance is reduced. As a result, the advantages of the embodiment of the zero-degree ply which is embodied between the two working plies can be made possible together with a high level of belt durability and low rolling resistance.

An embodiment of a pneumatic vehicle tire wherein the extension length (p) of the coupling is embodied with 5 mm≤p≤15 mm is particularly advantageous. As a result, the movement between the working plies can be reliably reduced with secure coupling, and the rolling resistance can be improved.

An embodiment of a pneumatic vehicle tire wherein the two working plies extend from the extension section with the length (p) of the coupling in the axial direction pointing away from the belt ply without contact with one another over an extension section of the length (t) where 5 mm≤t≤10 mm, and one of the two working plies ends there, is particularly advantageous. In the extension section of the length (t) the distance $s_1$, measured in the radial direction R, of the reinforcement members of the one working ply with respect to the reinforcement members of the other working ply is embodied, in particular with a constant increase along the extension up to the edge of the one working ply, with $s_1>1.5$ mm, in particular with $s_1<5$ mm. As a result, the rolling resistance and durability of the belt and therefore of the tire can be optimized.

An embodiment of a pneumatic vehicle tire wherein the reinforcement members of at least one of the two working plies, in particular of both working plies, have in each case a breaking strength F where F>1800N, in particular where F>2500N is particularly advantageous. As a result, optimum puncture resistance to prevent cord breakages is made possible together with good wear behavior and a high level of durability.

An embodiment of a pneumatic vehicle tire wherein the reinforcement members of at least one of the two working plies, in particular of both working plies, each have an extension D of $0.28\% \leq D \leq 0.32\%$ at 10% of the breaking strength is particularly advantageous. The extension also permits relatively small stones to move, while at the same time the shearing strength is sufficiently high for an optimized wear behavior.

An embodiment of a pneumatic vehicle tire wherein a further belt ply having parallel reinforcement members embedded in rubber is formed radially outside the radially outer working ply on the outer working ply is particularly advantageous because the additional outer belt ply can further increase the protection against puncturing.

An embodiment of a pneumatic vehicle tire wherein the further belt ply is embodied as a zero-degree ply whose reinforcement members enclose in their orientation an angle $\delta$ with respect to the circumferential direction U of the pneumatic vehicle tire where $0° \leq \delta \leq 5°$ is particularly advantageous because as a result the circumferential forces are substantially distributed between two belt plies. As a result, cord breaks can be additionally counteracted when possible excessively high loads occur during use of the tire.

An embodiment of a pneumatic vehicle tire wherein the reinforcement members of the additional belt ply enclose in their orientation an angle $\delta$ with respect to the circumferential direction U of the pneumatic vehicle tire where $10° \leq \delta \leq 90°$, in particular where $15° \leq \delta \leq 45°$, is particularly advantageous. The shearing strength achieved in this manner has a positive effect on achieving a uniform wear pattern with additional protection against the penetration of stones.

An embodiment of a pneumatic vehicle tire wherein a further belt ply having parallel reinforcement members embedded in rubber is formed radially inside the radially inner working ply between the carcass and the radially inner working ply, the reinforcement members of which further belt ply enclose in their orientation an angle $\epsilon$ with respect to the circumferential direction U of the pneumatic vehicle tire, in particular where $45° \leq \epsilon \leq 90°$ is particularly advantageous because the additionally formed barrier ply provides an optimum force flux from the carcass into the belt formed from the belt plies and also reduces the movement of the working plies and therefore further improves the durability.

An embodiment of a pneumatic vehicle tire wherein the radially outer of the two working plies is made smaller in its axial extent in the pneumatic vehicle tire than the radially inner of the two working plies is particularly advantageous, wherein, in particular, the radially outer of the two working plies ends on both axial sides within the axial extent region of the radially inner of the two working plies. This can avoid a situation in which the outer working ply is subjected to a large amount of movement in the region of the shoulders. The durability can therefore be further improved.

An embodiment of a pneumatic vehicle tire wherein the reinforcement members of the zero-degree ply/plies are reinforcement members made of steel is particularly advantageous. This further promotes a high level of circumferential strength, good durability and uniform wear.

In an embodiment of a pneumatic vehicle tire, the reinforcement members of at least the zero-degree ply arranged between the working plies are high-elongation cords. As a result, the raising of the belt in the construction process can be made possible in a simple manner.

An embodiment of a pneumatic vehicle tire wherein the reinforcement members of the additional belt ply are reinforcement members made of steel is particularly advantageous because this promotes good protection against puncturing in a simple manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
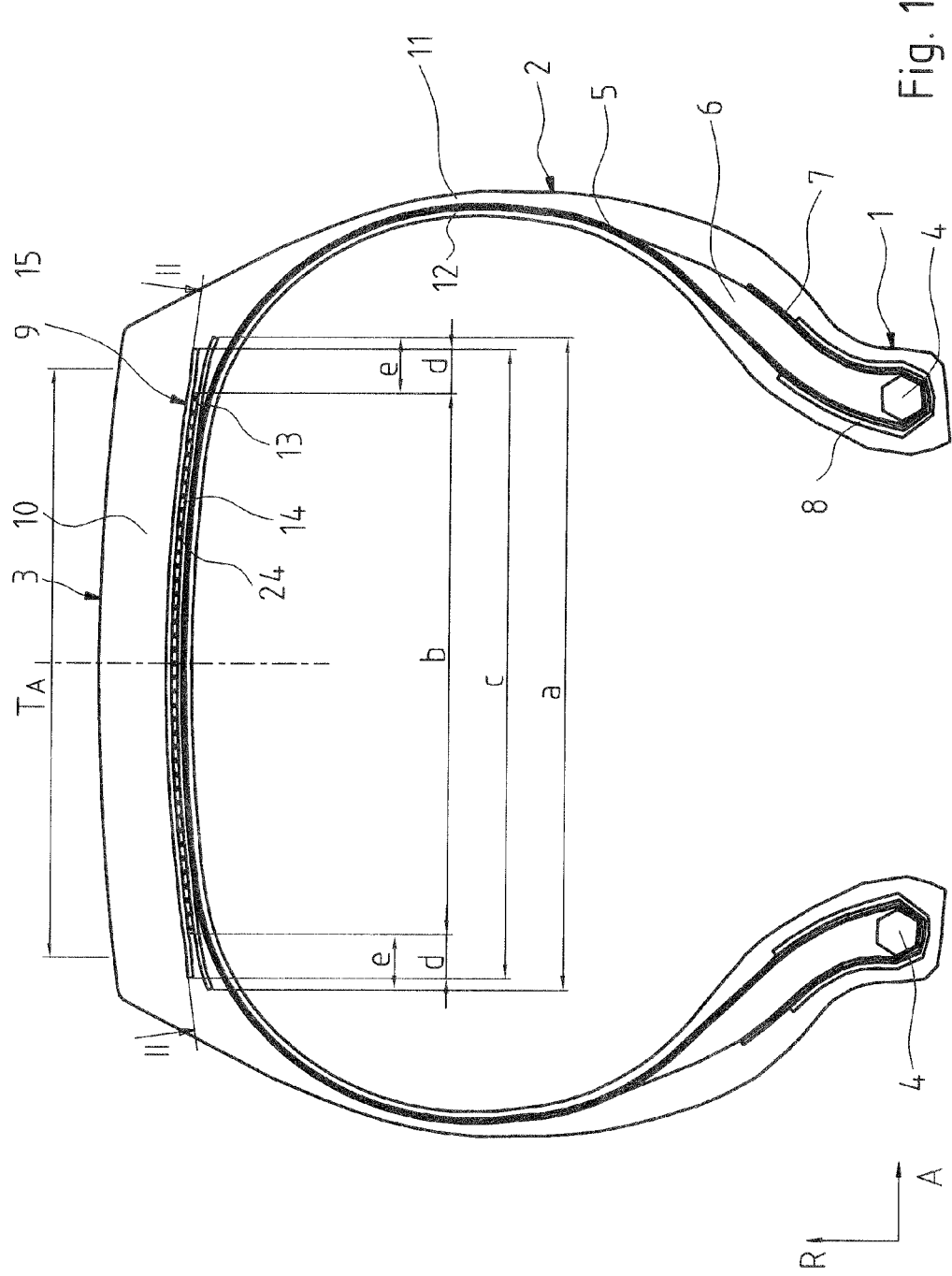
FIG. 1 is a cross-sectional view of a pneumatic vehicle tire of a radial design for utility vehicles.
Figure 2:
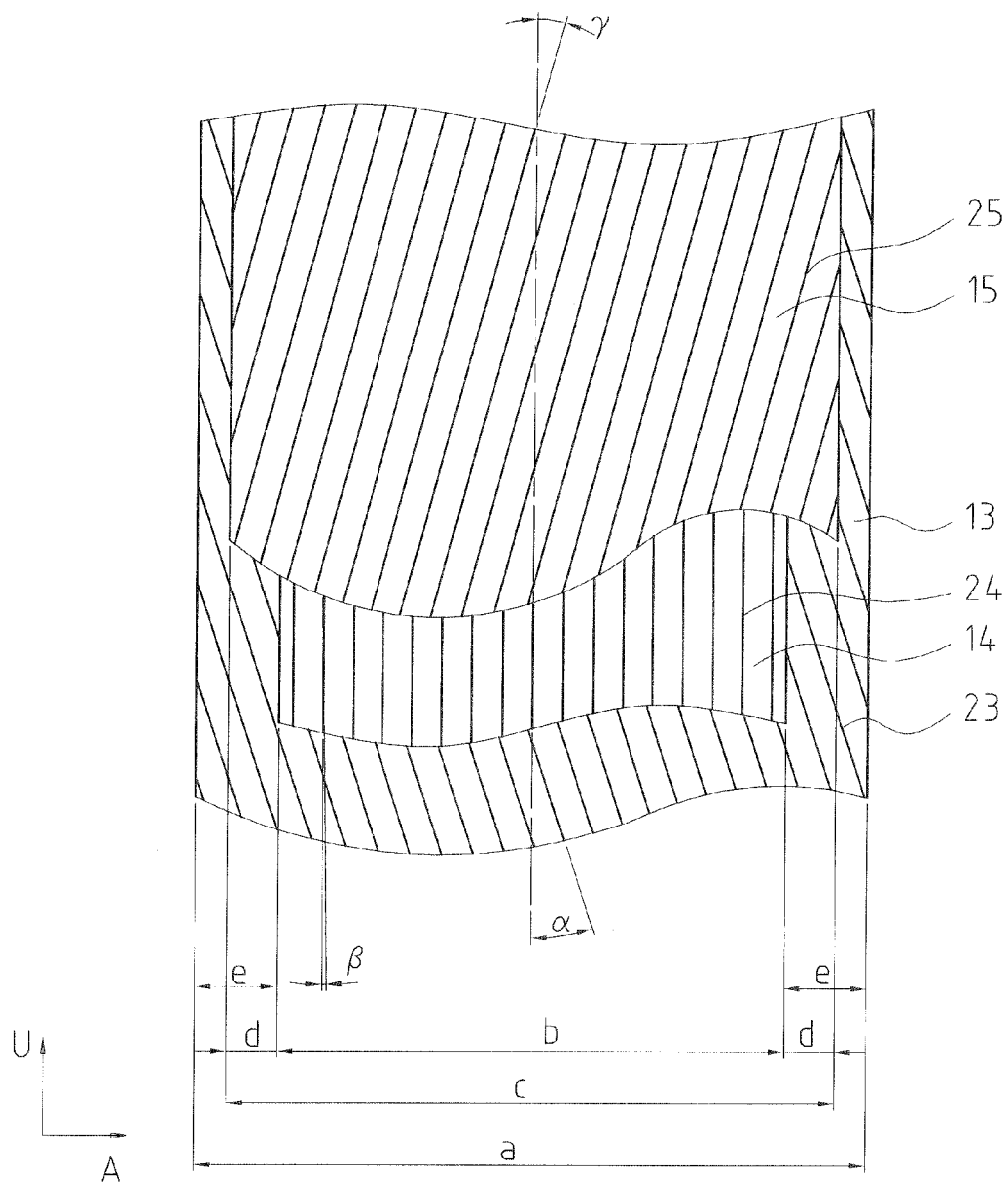
FIG. 2 is a top plan view of the belt of FIG. 1 according to section II-II of FIG. 1 in which all the other components of the tire are not shown for the sake of simplification.

FIGS. 1 and 2 show a pneumatic tire of radial configuration for a utility vehicle with two side walls 2 which are extended in the direction R of the vehicle tire and a crown region 3 which is formed axially between them. The side walls are each formed with a bead region 1 on their extent end directed inward in the radial direction, in which bead region 1 a bead core 4, which has high tensile strength in the circumferential direction U and extends over the circumference of the tire in the circumferential direction, is formed. The bead cores 4 are formed wound from wire which extends in the circumferential direction U of the pneumatic vehicle tire and is embedded in rubber. An apex 6 which is triangular in cross section is formed from a hard rubber material on the bead cores 4.

The pneumatic vehicle tire is formed with a carcass 5 which, starting from the bead core 4 formed in the left-hand bead region 1 of the pneumatic vehicle tire, extends outward in the radial direction R of the pneumatic vehicle tire through the left-hand side wall 2 as far as the crown region 3 and, in the crown region 3, extends in the axial direction A of the pneumatic vehicle tire up to the right-hand side wall 2 and, in the right-hand side wall 2 of the pneumatic vehicle tire, extends radially inward as far as the bead core 4 formed in the bead region 1 of the right-hand side wall 2. The carcass is formed as a folded-over part 7 extending radially outward in both core regions 1, in each case along the axial inner side of the bead core 4 up to the radial inner side of the bead core 4 corresponding thereto, then as an extension in the axial direction along the radial inner side of the bead core 4 up to the axial outer side of the bead core 4 and then as an extension on the axial outer side of the bead core 4. The carcass 5 extends with its folded-over part 7 along the axial outer side of the apex 6 and ends on the axial outer side of the apex 6. The carcass is formed from a carcass ply which extends in the circumferential direction U over the entire circumference of the pneumatic vehicle tire and has parallel cords—for example steel cords—which are embedded in rubber and extend essentially in the radial direction R in the region of the side walls 2 and essentially in the axial direction A in the crown region. An inner layer 12 made of particularly air-impermeable rubber material extends from the left-hand bead region 1 as far as the right-hand bead region 1 on the side of the carcass 5 directed to the inside of the tire. An additional bead reinforcing strip 8, which extends over the entire circumference of the pneumatic vehicle tire, is formed in each bead region 1 on the side of the carcass 5 directed away from the bead core 4. The bead reinforcing strip 8 is, for example, a material strip which is embedded in rubber and composed of parallel reinforcement members of a textile or metallic design.

A belt 9 which extends over the entire circumference of the pneumatic vehicle tire in the circumferential direction U and in the axial direction A from the left-hand tire shoulder as far as the right-hand tire shoulder is formed in the region of the tire crown 3 in the radial direction R of the pneumatic vehicle tire outside the carcass 5 on the carcass 5. The belt 9 is formed from three belt plies 13, 14 and 15 which are arranged resting on one another and above one another in the radial direction R. A profiled tread 10, which extends over the entire circumference of the pneumatic vehicle tire in the circumferential direction U and in the axial direction A from the left-hand tire shoulder as far as the right-hand tire shoulder and which completely covers the belt 9, is formed radially outside the belt 9 on the belt 9. In the region of the tire side walls 2, a side wall rubber strip 11, which extends in the radial direction R from the bead region 1 as far as the profiled tread 10 in the crown region 3, is formed on the side of the carcass 5 directed away axially from the tire.

The radially inner belt ply 13 and the radially outer belt ply 15 are embodied as working plies of the tire and each extend in the circumferential direction U over the entire circumference of the pneumatic vehicle tire and in the axial direction A from the left-hand tire shoulder as far as the right-hand tire shoulder. The working ply 13 is formed from a ply of thread-shaped parallel reinforcement members 23 which are embedded in rubber, extend essentially linearly over the entire width (a) measured in the axial direction A of the belt ply 13 and enclose an angle α of inclination with respect to the circumferential direction U where $10°≤α<45°$. The working ply 15 is formed from a ply of thread-shaped parallel reinforcement members 25 which are embedded in rubber, extend essentially linearly over the entire axial width (c) of the belt ply 15 and enclose an angle γ of inclination with respect to the circumferential direction U where $10°≤γ≤45°$. The direction of inclination of the reinforcement members 25 of the working plies 15 viewed in the circumferential direction U is formed in the opposite axial direction A to the direction of inclination of the reinforcement members 23 of the working ply 13. The third belt ply 14, which is formed between the two working plies 15 and 13, extends in the circumferential direction U over the entire circumference of the pneumatic vehicle tire and in the axial direction from the left-hand tire shoulder to the right-hand tire shoulder and is embodied as a zero-degree ply. For this purpose, the belt ply 14 is formed from parallel thread-shaped reinforcement members which are embedded in rubber and which extend linearly over the entire circumference of the pneumatic vehicle tire enclosing an angle β where $0°≤β≤5°$ with respect to the circumferential direction U and are therefore oriented essentially in the circumferential direction U of the pneumatic vehicle tire. All three belt plies 13, 14 and 15 extend on both axial sides, in each case as far as a position in the corresponding tire shoulder which lies axially outside the ground footprint—represented by the axial width $T_a$ of the ground footprint. Over its entire axial extent the belt ply 14 is in direct contact both with the working ply 13 arranged under it and with the working ply 15 arranged above it.

The zero-degree ply 14 extends in the axial direction A over an axial width (b), the lower working ply 13 extends in the axial direction A over an axial width (a), and the upper working ply 15 extends in the axial direction A over an axial width (c) in the tire where a>c>b. In this context, the inner working ply 13 extends by an axial extent length (e) on both axial sides of the zero-degree ply 14 beyond the axial position of the corresponding belt edges of the zero-degree ply 14. Likewise, the outer working ply 15 extends by an axial extent length (d) in each of the two axial directions beyond the axial position of the corresponding belt edges of the zero-degree ply 14. For the extent lengths (e) and (d) of this protruding portion the following applies: e>d. The dimension (d) is embodied here as $d≥10$ mm. The dimension (e) in the embodiment is embodied as $e≤60$ mm. The two working plies 13 and 15 are not in contact in the region of the protruding portion either.

The reinforcement members 23 and 25 of the two working plies 13 and 15 are steel cords of a known type which under tensile loading have a breaking strength $F>2500N$, and at 10% of the breaking strength have an expansion D of $0.28%≤D≤0.32%$. Such steel cords are, for example, steel cords of the type 3+×0.35HT with a breaking strength F=3000N and with an expansion D of D=0.30% at 10% of the breaking strength. The values are determined with the BISFA E6 standard test method for steel cords.

In an embodiment the reinforcement members 24 are steel cords. In another embodiment, the reinforcement members 24 are steel cords which are embodied as high-elongation cord (HE cord). Such highly extensible high-elongation cords have a modulus of extensibility under extension between 0% and 2%, which is lower than their modulus of elasticity under extension of more than 2%.

In an exemplary embodiment, the following are selected: β=1°, α=20°, γ=20°, d=11 mm and e=15 mm.

In an alternative embodiment of the above-mentioned embodiment, the angle α of inclination of the reinforcement members 23 of the inner working ply 13 is, in each case, made larger than the angle γ of inclination of the reinforcement members 25 of the outer working ply 15.

In an alternative embodiment of the above mentioned embodiment, the angle α of inclination of the reinforcement members 23 of the inner working ply 13 is, in each case, made smaller than the angle γ of inclination of the reinforcement members 25 of the outer working ply 15.

Figure 3:
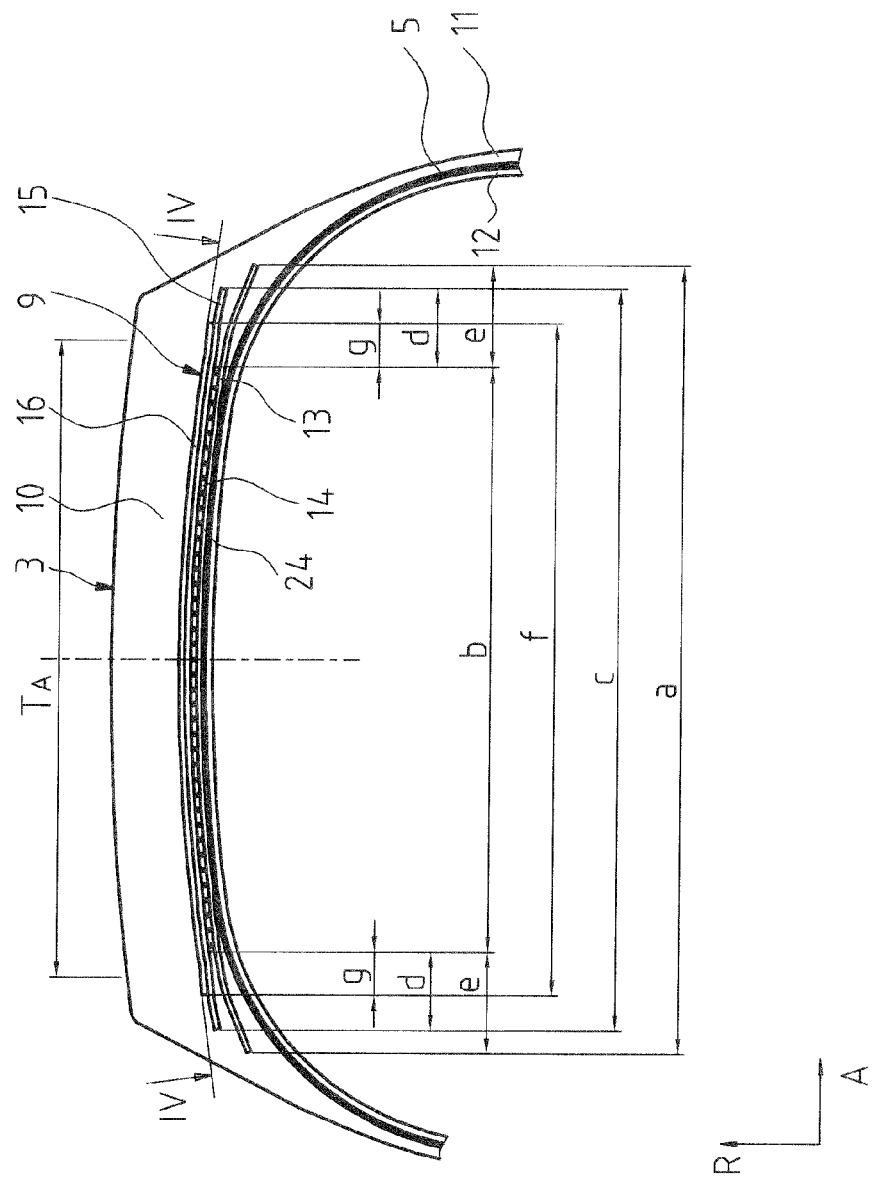
FIG. 3 is a cross-sectional illustration of a detail of a pneumatic vehicle tire in a manner which is analogous to the illustration in FIG. 1 with an alternative belt embodiment.
Figure 4:
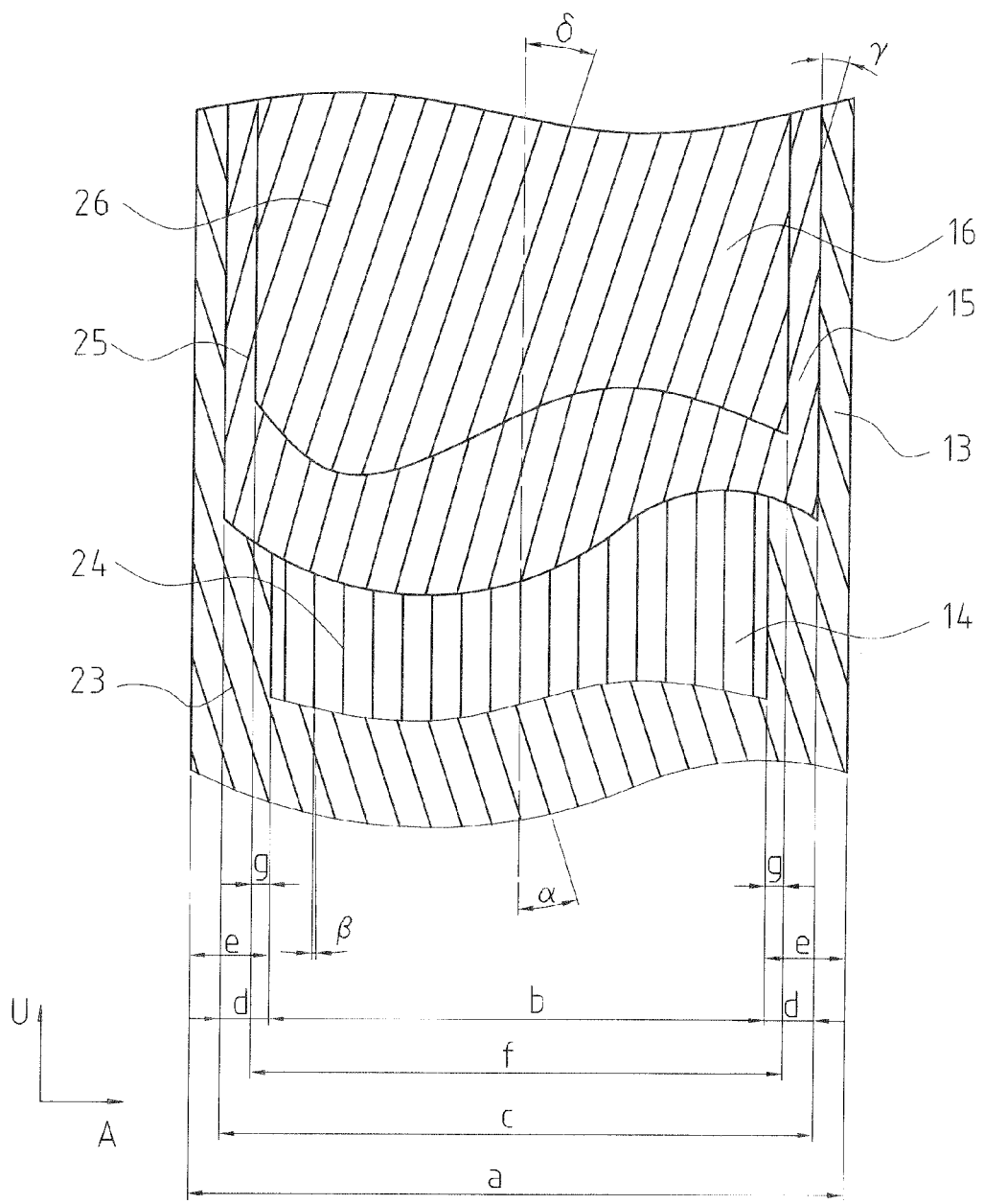
FIG. 4 is a top plan view of the belt of FIG. 3 according to section IV-IV of FIG. 3 in which all the other components of the tire are not shown for the sake of simplification.

FIGS. 3 and 4 show a further alternative embodiment in which the belt 9 is embodied with an additional belt ply 16 in addition to the belt plies 13, 14 and 15 illustrated in FIGS. 1 and 2 on the radial outer side of the outer working ply 15, which additional belt ply 16 extends in the circumferential direction U over the entire circumference of the pneumatic vehicle tire and in the axial direction A of the pneumatic vehicle tire from the left-hand tire shoulder as far as the right-hand tire shoulder. The belt ply 16 is formed from a ply of thread-shaped parallel reinforcement members 26 which are embedded in rubber, extend essentially linearly over the entire axial width (f) of the belt ply 16 and enclose an angle δ of inclination with respect to the circumferential direction U where $15° \leq δ \leq 45°$. The belt ply 16 extends over its entire axial extent in direct contact with the working ply 15 and ends in the axial direction A at its two belt ply edges, in each case in an axial position between the closest belt ply edge of the zero-degree ply 14 and the closest belt ply edge of the radially outer belt ply 15 with an axial distance (g) from the belt ply edge of the zero-degree ply 14 where g<d. The width (f) is the measure of the axial extent of the additional belt ply 16 where b<f<c<a.

The reinforcement members 26 of the belt ply 16 are formed in one embodiment with the same direction of inclination as the reinforcement members 25 of the working ply 15.

The reinforcement members 26 are steel cords.

In another embodiment the additional belt ply 16 is embodied as a zero-degree ply and the angle δ of inclination of its reinforcement members 26 which extend over the entire circumference of the pneumatic vehicle tire is embodied as $0° \leq δ \leq 5°$. When the additional working ply 16 is formed as a zero-degree ply, the reinforcement members 26 are embodied as steel cords. In another embodiment, the reinforcement members 26 of the working ply 16 which is embodied as a zero-degree ply are steel cords which are embodied as high-elongation cord (HE cord). Such highly extendable high-elongation cords have a modulus of elasticity under extension between 0% and 2%, which is less than their modulus of elasticity under extension of more than 2%.

Figure 5:
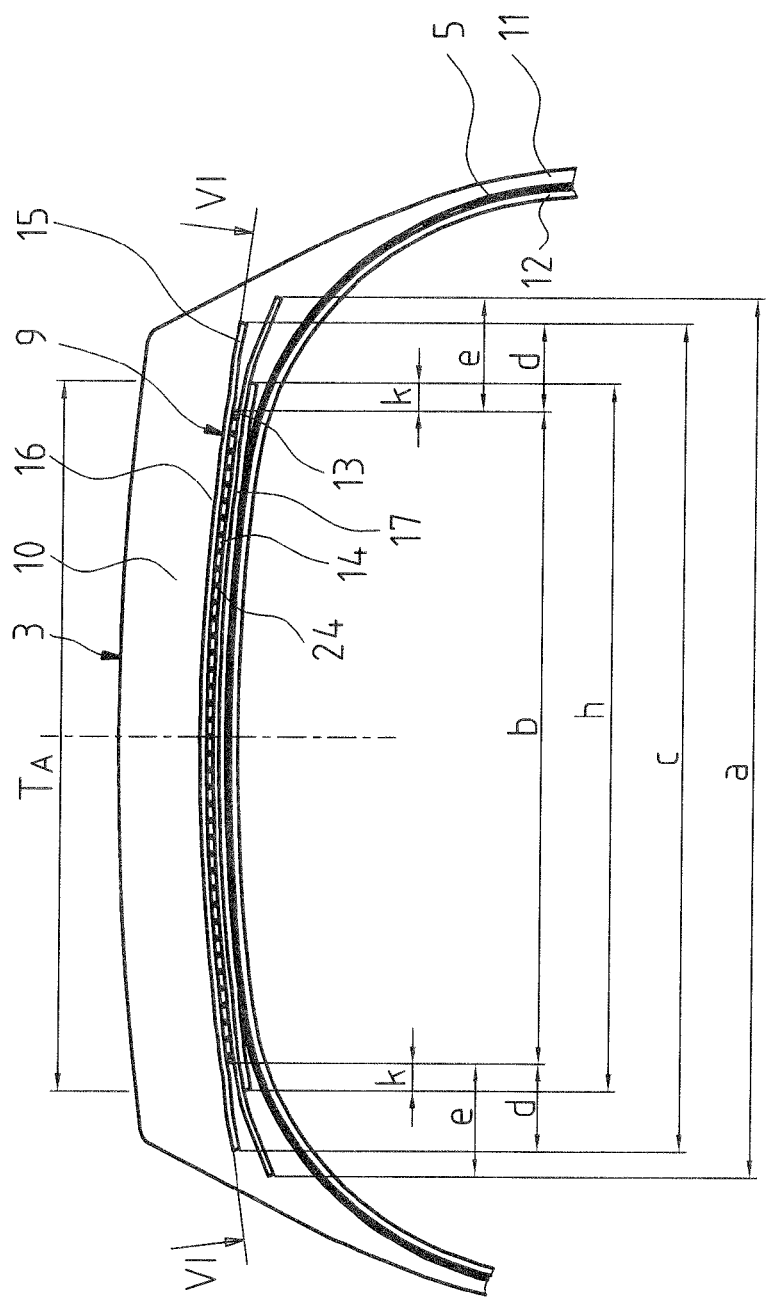
FIG. 5 shows a detail of a cross-sectional view of a pneumatic tire in a manner which is analogous to the illustration in FIG. 1 with a further alternative embodiment of the belt.
Figure 6:
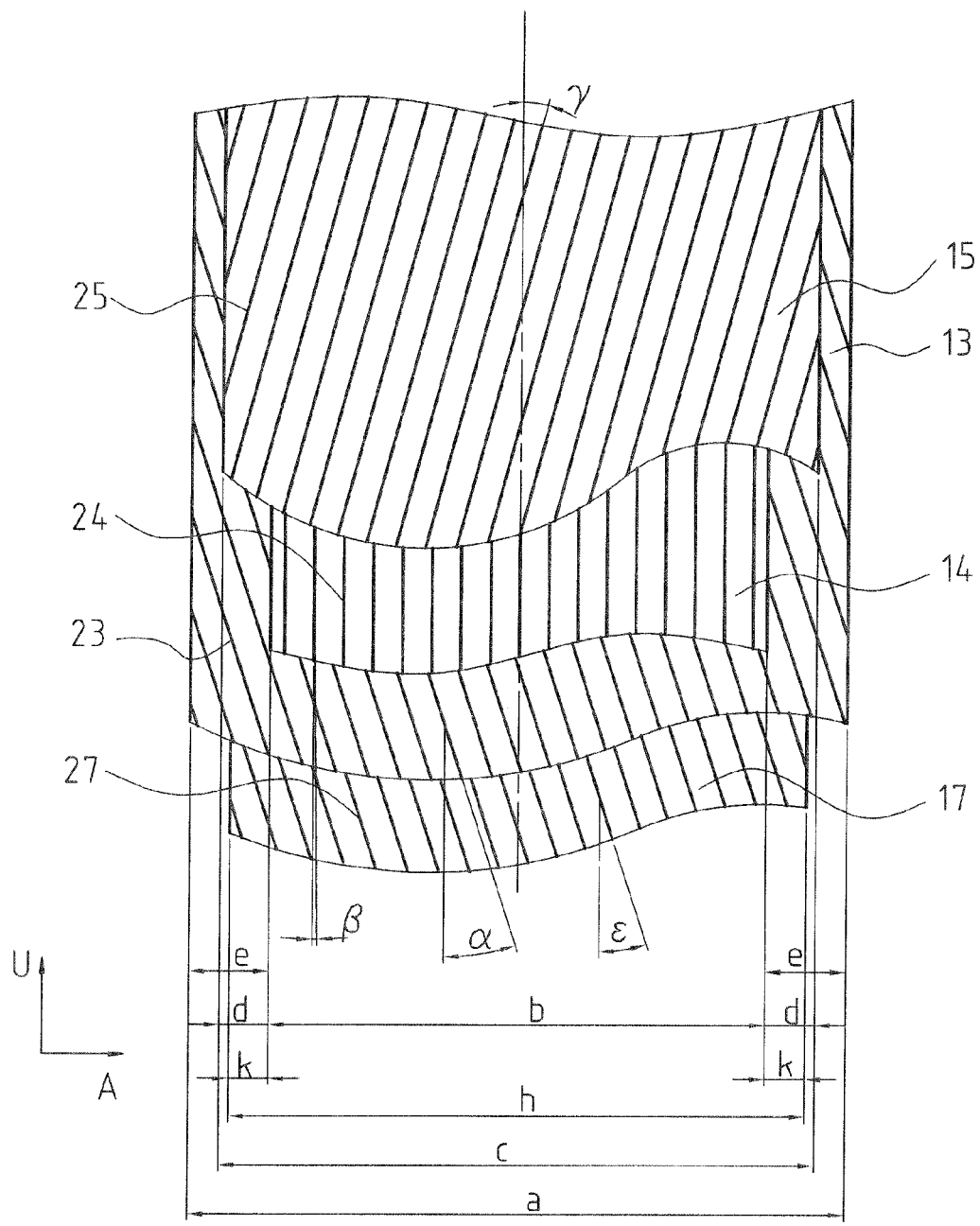
FIG. 6 is a top plan view of the belt of FIG. 5 according to section VI-VI of FIG. 5 in which all the other components of the tire are not shown for the sake of simplification; and, FIG. 7 is a cross sectional view of a belt edge section of the pneumatic vehicle tire of FIG. 1 with a detailed illustration of the coupling in order to illustrate an embodiment of the coupling of the working plies of a belt according to the invention also for the other embodiments according to FIGS. 3 and 5, by way of example.

FIGS. 5 and 6 show a further alternative embodiment in which, in contrast to the embodiments shown in FIGS. 1 and 2, the belt 9 is additionally embodied with a belt ply 17 which is arranged in a radial position between the radially inner working ply 13 and the carcass 5 and which extends in the circumferential direction U over the entire circumference of the pneumatic vehicle tire and in the axial direction A of the pneumatic vehicle tire from the left-hand tire shoulder as far as the right-hand tire shoulder. The belt ply 17 is formed from a ply of thread-shaped parallel reinforcement members 27 which are embedded in rubber, which extend essentially linearly over the entire axial width (h) of the belt ply 17 and enclose an angle ε of inclination with respect to the circumferential direction U where $45° \leq ε \leq 90°$, for example where ε=50°. The belt ply 17 extends over its entire axial extent in direct contact with the working ply 13 and ends in the axial direction A at its two belt ply edges, in each case in an axial position between the closest belt ply edge of the zero-degree ply 14 and the closest belt ply edge of the radially outer working ply 15 with an axial distance (k) from the belt ply edge of the zero-degree ply 14 where k<d<e. The width (h) is the measure of the axial extent of the additional belt ply 17 where b<h<c<a.

The reinforcement members 27 of the belt ply 17 are embodied in one embodiment with the same angle of inclination as the reinforcement members 23 of the radially inner working ply 13.

The reinforcement members 27 are steel cords.

In further alternative embodiments (not illustrated), in the embodiments with an additional belt ply 16 (shown in conjunction with FIGS. 3 and 4), the additional inner belt ply 17 (shown in conjunction with FIGS. 5 and 6) is also formed. In this case, the belt 9 is formed from a 5-ply arrangement with the belt plies 17, 13, 14, 15 and 16 arranged one on top of the other from radially inside to radially outside.

Figure 7:
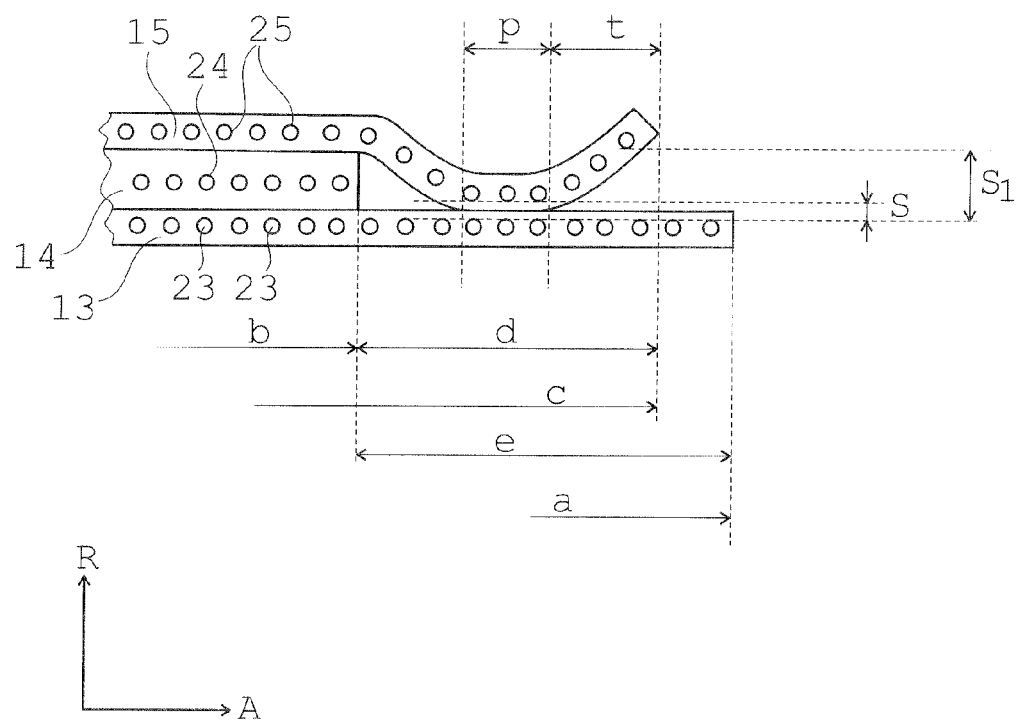

FIG. 7 shows in an enlarged view of the detail the embodiment, embodied in the respective embodiments shown in FIGS. 1 to 6 and described above, of the coupling of the working plies 13 and 15 according to the invention using the example of the belt illustrated in FIGS. 1 and 2. The embodiment of the coupling is implemented in each case in an analogous fashion in the other embodiments which are illustrated and/or described.

For the sake of simplification, FIG. 7 shows merely the right-hand belt edge region of the working plies 13 and 15 and of the zero-degree ply 14 embodied between them in the radial direction. As is apparent from FIG. 7, the relatively narrow working ply 15 and the wider working ply 13 are formed starting from the axial edge of the working ply 15, embodied to be narrower, in the axial direction A with respect to the zero-degree ply 14 over a first extension section of the extension length (t) with 5 mm≤t≤10 mm without contact with one another and in a second extension section, adjoining the first extension section in the axial direction A with respect to the zero-degree ply 14, of the extension length (p) with 5 mm≤p≤15 mm along the entire extension of the extension length (p) in direct contact with one another. The two belt plies 13 and 15 are formed without direct contact with one another in the axial direction A inwards with respect to the zero-degree ply 14 adjoining the second extension region of the length (p).

The extension lengths (p) and (t) are embodied with d≥(p+t)≥(0.9d). Within the second extension region of the length (p) with contact of the two working plies 15 and 13 with respect to one another, the distance (s), which is measured in the radial direction R of the pneumatic vehicle tire, between the reinforcement members 23 of the working ply 13 and the reinforcement members 25 of the working ply 15 is embodied with s≤1.5 mm, for example with s=1 mm. In the first extension region of the extension length (t), which is embodied between the extension region of the length (p) and the belt ply edge of the relatively narrow working ply 15, the distance $s_1$, measured in the radial direction R, between the reinforcement members 23 of the belt ply 13 and the reinforcement members 25 of the belt ply 15 is embodied in a continuously increasing fashion with 5 mm>$s_1$>1.5 mm along the entire extent of the extension length (t), starting from the value of the variable (s) at the junction between the second extension region and the first extension region of the extension length (t) along the first extension region of the length (t) up to the belt ply edge of the belt ply 15.

The distance, measured in the radial direction R, between the reinforcement members 23 of the working ply 13 and the reinforcement members 25 of the working ply 15 also increases continuously between the second axial extension section of the extension length (p) and the zero-degree ply 14.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

1 bead region
2 side wall
3 crown region
4 bead core
5 carcass
6 apex 7 carcass turn-over
8 bead reinforcing strip
9 belt
10 profiled tread
11 side wall rubber strip
12 inner layer
13 belt ply (working ply)
14 belt ply (zero-degree ply)
15 belt ply (working ply)
16 belt ply
17 belt ply
23 reinforcement member
24 reinforcement member
25 reinforcement member
26 reinforcement member
27 reinforcement member

What is claimed is:

1. A pneumatic vehicle tire, the pneumatic vehicle tire defining a circumferential direction (U), a radial direction (R) and an axial direction (A), the pneumatic vehicle tire comprising:
   a carcass;
   at least a first, a second and a third belt ply arranged resting one on top the other radially inward to radially outward and said plurality of belt plies conjointly defining a tire belt configured radially outside said carcass;
   a profiled tread constructed radially outside said belt and built up on said belt;
   said first belt ply being configured as a radially inner working ply having a plurality of parallel first reinforcement members made of steel embedded in rubber;
   said third belt ply being configured as a radially outer working ply having a plurality of parallel third reinforcement members made of steel embedded in rubber;
   said second belt ply being configured as a zero-degree ply having a plurality of parallel second reinforcement members embedded in rubber and being arranged between said first and said third belt plies;
   said first reinforcement members of said inner working ply having an orientation which, with reference to the circumferential direction (U), encloses an angle α lying in a range of $10° \leq \alpha \leq 45°$;
   said third reinforcement members of said outer working ply having an orientation which, with reference to the circumferential direction (U), encloses an angle γ lying in a range of $10° \leq \gamma \leq 45°$;
   said first reinforcement members having, in relation to the circumferential direction (U), an axial inclination which is opposite the axial inclination of said third reinforcement members to the circumferential direction (U);
   said second reinforcement members of said zero degree ply having an orientation which, with reference to the circumferential direction (U), encloses an angle β lying in a range of $0° \leq \beta \leq 5°$;
   said first, second and third reinforcement members each having respective breaking strengths;
   the reinforcement members of at least one of said inner and said outer working plies having an extensibility D lying in a range of $0.22\% \leq D \leq 0.4\%$ at 10% of the breaking strength thereof;
   said zero degree ply having first and second sides in the axial direction (A);
   said inner working ply and said outer working ply being configured wider than said zero-degree ply such that said inner working ply extends beyond said first side of said zero degree ply in a first axial section and beyond said second side of said zero degree ply in a second axial section and said outer working ply extends beyond said first side of said zero degree ply in a third axial section and beyond said second side of said zero degree ply in a fourth axial section;
   said first axial section of said inner working ply and said third axial section of said outer working ply being coupled in contact with one another in a first extension region having a width p1>0 mm;
   said second axial section of said inner working ply and said fourth section of said outer working ply being coupled in contact with one another in a second extension region having a width p2>0 mm; and,
   said first reinforcement members of said inner working ply and said third reinforcement members of said outer working ply being at a distance $s \leq 1.5$ mm from one another in the radial direction in said first and said second extension regions.

2. The pneumatic vehicle tire of claim 1, wherein:
   said first extension region has a width p1 lying in the range $5 \text{ mm} \leq p1 \leq 15 \text{ mm}$; and,
   said second extension region has a width p2 lying in the range $5 \text{ mm} \leq p2 \leq 15 \text{ mm}$.

3. The pneumatic vehicle tire of claim 1, wherein:
   said inner working ply and said outer working ply conjointly define a third extension region having a first outer edge and extending from said first extension region in the axial direction away from said second belt ply, said inner and said outer working ply being free of contact from each other in said third extension region;
   said inner working ply and said outer working ply further conjointly define a fourth extension region having a second outer edge and extending from said second extension region in the axial direction away from said second belt ply, said inner and said outer working ply being free of contact from each other in said fourth extension region;
   one of said inner working ply and said outer working ply is dimensioned to terminate at said first outer edge;
   one of said inner working ply and said outer working ply is dimensioned to terminate at said second outer edge;
   said first reinforcement members and said second reinforcement members are at a distance $s_1 > 1.5$ mm from each other in said third extension region;
   said first reinforcement members and said second reinforcement members have a distance $s_2 > 1.5$ mm from each other in said fourth extension region;
   said third extension region having a width t1 in a range of $5 \text{ mm} \leq t1 \leq 10 \text{ mm}$; and,
   said fourth extension region having a width t2 in a range of $5 \text{ mm} \leq t2 \leq 10 \text{ mm}$.

4. The pneumatic vehicle tire of claim 3, wherein each of said distances $s_1$ and $s_2$ are smaller than 5 mm.

5. The pneumatic vehicle tire of claim 3, wherein:
   said distance $s_1$ steadily increases up to said first outer edge; and,
   said distance $s_2$ steadily increases up to said second outer edge.

6. The pneumatic vehicle tire of claim 1, wherein at least one of said first reinforcement members and said second reinforcement members have a breaking strength F>1800 N.

7. The pneumatic vehicle tire of claim 1, wherein at least one of said first reinforcement members and said second reinforcement members have a breaking strength F>2500 N.

8. The pneumatic vehicle tire of claim 1, wherein at least one of said first reinforcement members and said second reinforcement members has an extensibility D lying in a range of $0.28\% \leq D\ 0.32\%$ at 10% breaking strength thereof.

9. The pneumatic vehicle tire of claim 1 further comprising a fourth belt ply having a plurality of parallel fourth reinforcement members embedded in rubber and being arranged radially outside said outer working ply on said outer working ply.

10. The pneumatic vehicle tire of claim 9, wherein:
said fourth belt ply is configured as a zero-degree ply;
said fourth reinforcement members have an orientation which, with respect to the circumferential direction, encloses an angle δ lying in the range of $0° \leq \delta \leq 5°$.

11. The pneumatic vehicle tire of claim 9, wherein said fourth reinforcement members have an orientation which, with respect to the circumferential direction, encloses an angle δ lying in the range of $10° \leq \delta \leq 90°$.

12. The pneumatic vehicle tire of claim 9, wherein said fourth reinforcement members have an orientation which, with respect to the circumferential direction, encloses an angle δ lying in the range of $15° \leq \delta \leq 45°$.

13. The pneumatic vehicle tire of claim 9 further comprising:
a fifth belt ply disposed between said carcass and said inner working ply and having a plurality of parallel fifth reinforcement members embedded in rubber; and,
said fifth reinforcement members having an orientation which, with respect to the circumferential direction, encloses an angle ε lying in the range of $45° \leq \epsilon \leq 90°$.

14. The pneumatic vehicle tire of claim 9, wherein said fourth reinforcement members are made of steel.

15. The pneumatic vehicle tire of claim 1 further comprising:
a fourth belt ply disposed between said carcass and said inner working ply and having a plurality of parallel fourth reinforcement members embedded in rubber; and,
said fourth reinforcement members having an orientation which, with respect to the circumferential direction, encloses an angle ε lying in the range of $45° \leq \epsilon \leq 90°$.

16. The pneumatic vehicle tire of claim 1, wherein:
said outer working ply has an axial spread (c);
said inner working ply has an axial spread;
said axial spread (c) being smaller than said axial spread of said inner working ply; and,
said outer working ply having two axial ends which are both disposed within the axial extension regions of said inner working ply.

17. The pneumatic vehicle tire of claim 1, wherein said second reinforcement members are made of steel.

18. The pneumatic vehicle tire of claim 1, wherein said second reinforcement members are high-elongation steel cords (HE).

* * * * *